US009999213B2

(12) United States Patent
Yu

(10) Patent No.: US 9,999,213 B2
(45) Date of Patent: Jun. 19, 2018

(54) MULTI FUNCTION PHOTO ELECTRO ACOUSTIC IONS DRONE

(71) Applicant: Simon Siu-Chi Yu, Oakland, CA (US)

(72) Inventor: Simon Siu-Chi Yu, Oakland, CA (US)

( * ) Notice: Subject to any disclaimer, the term of this patent is extended or adjusted under 35 U.S.C. 154(b) by 0 days. days.

(21) Appl. No.: 15/724,943

(22) Filed: Oct. 4, 2017

(65) Prior Publication Data

US 2018/0077918 A1   Mar. 22, 2018

Related U.S. Application Data

(63) Continuation of application No. 15/269,173, filed on Sep. 19, 2016, now Pat. No. 9,807,996.

(60) Provisional application No. 62/601,652, filed on Mar. 25, 2017.

(51) Int. Cl.
| | |
|---|---|
| *A01M 5/02* | (2006.01) |
| *B64D 45/00* | (2006.01) |
| *B64C 39/02* | (2006.01) |
| *G05D 1/02* | (2006.01) |
| *A01M 29/00* | (2011.01) |
| *A01M 1/10* | (2006.01) |
| *A01M 1/02* | (2006.01) |
| *A01M 1/08* | (2006.01) |
| *A01M 1/22* | (2006.01) |
| *A01M 1/06* | (2006.01) |

(52) U.S. Cl.
CPC .............. *A01M 5/02* (2013.01); *A01M 1/023* (2013.01); *A01M 1/06* (2013.01); *A01M 1/08* (2013.01); *A01M 1/106* (2013.01); *A01M 1/223* (2013.01); *A01M 29/00* (2013.01); *B64C 39/024* (2013.01); *B64D 45/0015* (2013.01); *G05D 1/0202* (2013.01); *B64C 2201/12* (2013.01)

(58) Field of Classification Search
CPC ..... B64C 2201/12; B64C 39/024; A01M 5/02
See application file for complete search history.

(56) References Cited

U.S. PATENT DOCUMENTS

| | | | | |
|---|---|---|---|---|
| 9,797,978 | B1 * | 10/2017 | Melamed | .................. G01S 3/14 |
| 2016/0307448 | A1 * | 10/2016 | Salnikov | ................. A01B 79/02 |
| 2017/0096222 | A1 * | 4/2017 | Spinelli | ................. B64C 39/024 |
| 2017/0231213 | A1 * | 8/2017 | Gordon | ............... A01M 7/0089 43/132.1 |

(Continued)

*Primary Examiner* — Christopher P Ellis
(74) *Attorney, Agent, or Firm* — Lyman Moulton, Esq.; Moulton Patents, PLLC

(57) ABSTRACT

An autonomous drone integrated with wide bandwidth, high energy acoustic wave generators sent to evict and eradicate agricultural pests within a patrolling area. The drone hovering close to a plant bombards its leaves and fruits with high energy acoustic waves via frequency and tone determined by an onboard synthesizer through acoustic power amplified to drive the sideways and bottom mounted acoustic wave generators. Agricultural pests such as caterpillar, beetle and the like are bombarded with powerful acoustic waves causing their bodies to vigorously vibrate and resonate with synthesizer frequency to dislodge or kill the pests. Other insects such as moths are forced airborne by a propeller's strong downdraft and are electrocuted by integrated high voltage screens. Inside a hotel room, the drone hovers close to a surface of a bedding mattress, bombarding the surfaces with powerful acoustic waves tuned to frequencies that cause bed bugs to resonate and die.

20 Claims, 14 Drawing Sheets

(56) References Cited

U.S. PATENT DOCUMENTS

2017/0253330 A1* 9/2017 Saigh .................... B64C 39/024
2017/0316283 A1* 11/2017 Fryshman ............ G06K 9/6267
2017/0327307 A1* 11/2017 von Flotow ........... B65D 85/68
2017/0372625 A1* 12/2017 Horinouchi ............ G08G 5/045
2018/0000575 A1* 1/2018 Fobi ........................ A61D 7/00

* cited by examiner

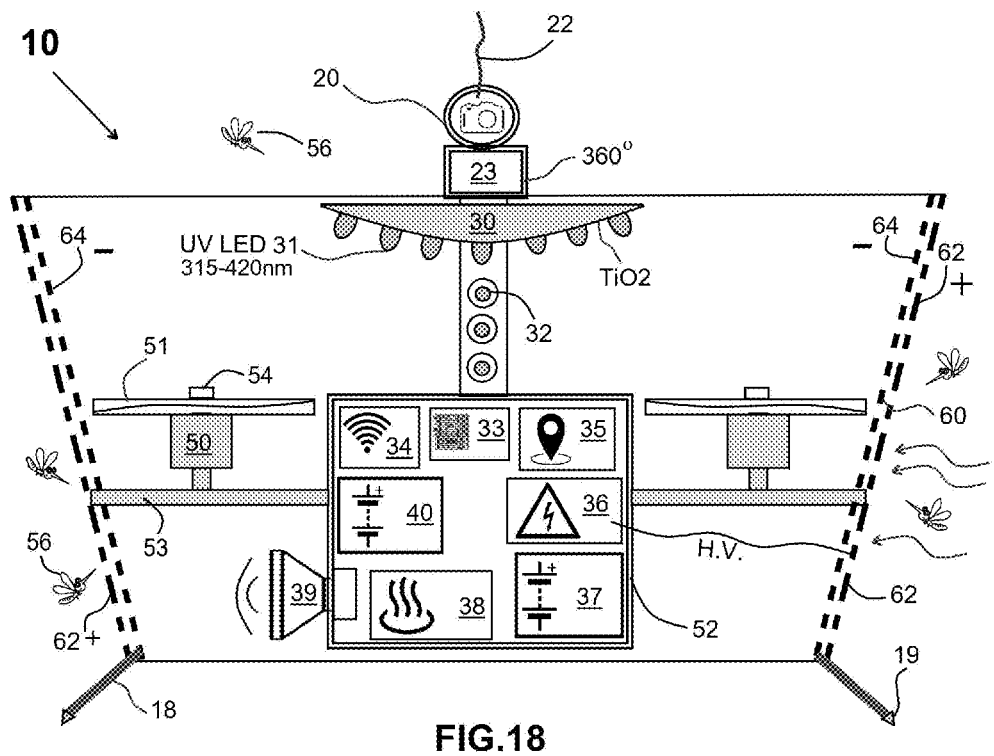
FIG.18
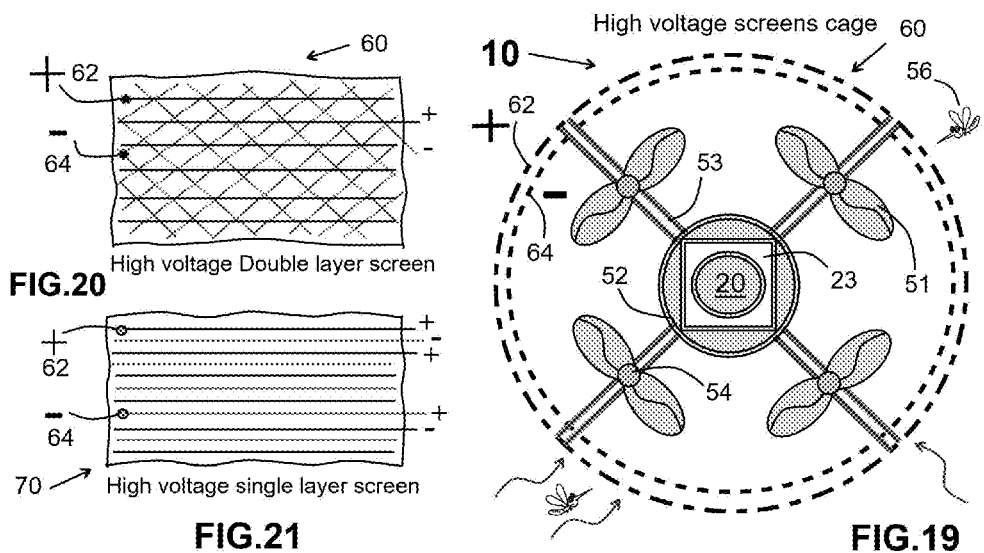
FIG.20
FIG.21
FIG.19

MULTI FUNCTION PHOTO ELECTRO ACOUSTIC IONS DRONE

CROSS-REFERENCE TO RELATED APPLICATION

This application is a continuation in part (CIP) of and claims priority to earlier filed U.S. Provisional patent application 62/601,652 titled 'Multi Function Photo Electro Acoustic Ions Drone' filed Mar. 25, 2017 also by Simon Siu-Chi Yu and allowed U.S. patent application Ser. No. 15/269,173 titled 'Bug Eater' filed Sep. 19, 2016 by Simon Siu-Chi claims the benefit of the earliest filing date and is incorporated herein by reference in its entirety.

BACKGROUND OF THE INVENTION

There are more pests than human population living on our planet. Agriculture pests are in direct completion with humans for food. It is difficult to control pests and keep them away from agricultural fields. Each year, millions of tons of food are destroyed by pests. At present, the most effective method to keep pests at bay is through spraying chemicals from air or ground. However, chemical spray comes with huge impact on the environment. More effect methods using tractor mounted air-assisted electrostatic sprayers can reduce the amount of chemicals used for a comparable area being sprayed from air. Despite the advancement in equipment being used today, soil damage and chemical residuals are also affecting beneficial creatures.

In snow countries, clearing snow on rooftops is a dangerous job. Every year, large numbers of people are injured due to falls from slippery roofs. Additionally, avalanche control involves using dangerous solid or liquid explosives. Also, bee colonies are declining. Furthermore, indoor air quality is worsening in highly populated urban areas.

This invention is directed toward the eradication of harmful flying insects. Flying insects are difficult to eliminate once they are airborne. Flies are particularly agile; it is almost impossible to take them down by swinging a towel. The present invention is concentrated on killing mosquitoes in large quantities since mosquitoes are more harmful to humans than other insects due to the many mosquito-transmitted diseases.

There are devices available on the market to deal with mosquitoes such as sticky glue coated tape, bed nets, traps, systems using greenhouse gas $CO_2$ to lure mosquitoes into a death trap and also the controversial DDT chemical spray. The latest innovation still undergoing research is the use of lasers to zap mosquitoes. However, all of these tools are passive devices or systems which are not effective in controlling the mosquito population. There are reports stating that laser equipped systems may be impractical as most mosquito-infested areas are in the poorer counties that do not have electricity and they require trained personnel to operate. Spraying DTT is currently the most effective eradication method at present but comes with negative environmental impact.

According to the World Health Organization, an estimated 200 million cases of malaria caused by mosquitoes and an estimated 600,000 malaria-related deaths occurred worldwide in 2012. Governments and aid agencies have set up many programs to distribute anti-malarial drugs, insecticides, and bed nets in endemic areas and these helpful tools have curbed the spread of malaria through the rural parts of the world. However, these existing measures and technology have only held the epidemic at bay. To have a real chance of conquering this disease, a new approach is needed.

SUMMARY OF THE INVENTION

A disclosed unmanned aerial vehicle drone (UAVD) includes an insect suction and eradication module 210 comprising at least one suction impeller and one of a constricting electrocution screen and a constricting mechanical trap. The UAVD also includes a control and communications module 220 comprising an electronic central processing unit (CPU), a wireless communication unit, an electronic camera and audio A/V unit and a bus configured to interconnect all drone modules. The UAVD additionally includes a navigation module 230 comprising a set of 360 degree obstacle avoidance sensors and positioning unit (GPS) configured to autonomously direct the drone to avoid obstacles while in flight. The UAVD further includes an insect attraction module 240 comprising scented cartridges, a visible lighting unit, a flashing UV (Ultraviolet) light unit, and a $CO_2$ (Carbon Dioxide) generator. The UAVD yet includes a security module 250 comprising an acoustic sounder to safeguard the drone from being stolen when stationed on the ground via acoustic deterrents and a failsafe in the event the deterrent fails.

An unmanned aerial vehicle drone (UAVD) and system comprises an acoustic wave generator module including a tone frequency synthesizer configured to create disruptive resonant and harmonic vibrations within a target at a variable distance from the module. The drone and system also include a navigation module comprising a set of 360 degree proximity and obstacle avoidance sensors and a positioning unit (GPS) configured to autonomously direct the drone proximal to but avoidant with a plurality of target locations while in flight. The drone and system additionally include an electronics module comprising an electronic central processing unit (CPU), a wireless communication unit, an electronic camera and audio A/V unit and a bus configured to interconnect all drone modules. The drone and system further include a removable and configurable modular cartridge and an electromechanical docking port for the cartridge with the drone, the cartridge therefore in electromechanical communication with the drone.

A method for an unmanned aerial vehicle drone (UAVD) management, the method comprising creating a disruptive resonant and harmonic vibration within a target at a variable distance via an acoustic wave generator module including a tone frequency synthesizer. The method also includes navigating via a module comprising a set of 360 degree proximity and obstacle avoidance sensors and a positioning unit (GPS) configured to autonomously direct the drone proximal to but avoidant with a plurality of target locations while in flight. The method additionally includes providing an electronics module comprising an electronic central processing unit (CPU), a wireless communication unit, an electronic camera and audio A/V unit and a bus configured to interconnect all drone modules. The method further includes providing a removable and configurable modular cartridge and an electromechanical docking port for the cartridge with the drone, the cartridge therefore in electromechanical communication with the drone.

Other aspects and advantages of embodiments of the disclosure will become apparent from the following detailed description, taken in conjunction with the accompanying drawings, illustrated by way of example of the principles of the disclosure herein.

BRIEF DESCRIPTION OF THE DRAWINGS

FIG. 18 is a cutaway diagrammatic illustration of a UAV Drone with a surrounding high voltage screen for killing flying insects in accordance with an embodiment of the present disclosure.

FIG. 19 is a top elevational view of the UAV Drone of FIG. 18 for killing flying insects in accordance with an embodiment of the present disclosure.

FIG. 20 is a schematic view of a high voltage double layer screen for the UAVD in accordance with an embodiment of the present disclosure.

FIG. 21 is a schematic view of a high voltage single layer screen for the UAVD in accordance with an embodiment of the present disclosure.

Figure 1:
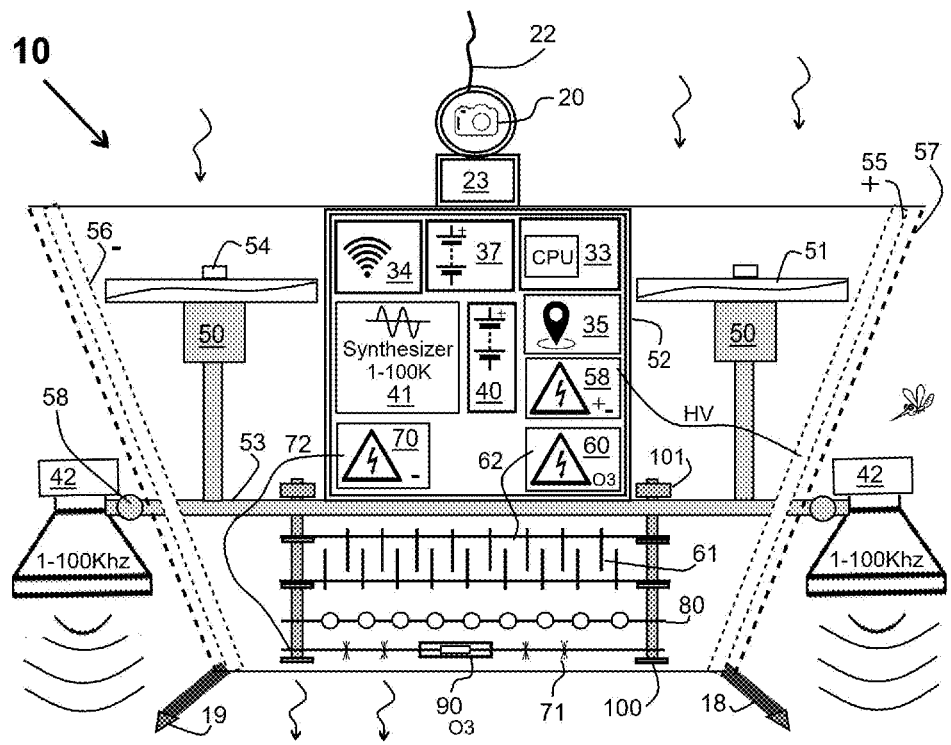
FIG. 1 is a cross section view of the multi-function drone in accordance with an embodiment of the present disclosure.

Throughout the description, similar and same reference numbers may be used to identify similar and same elements in the several embodiments and drawings. Although specific embodiments of the invention have been illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to a person of ordinary skill in the relevant art and having possession of this disclosure, are to be considered within the scope of the invention.

Throughout the present disclosure, the term 'cartridge' refers to a small part with a particular purpose that can be easily replaced with another similar part, used in a larger piece of equipment, ie the drone. The term 'module' refers to something made from a set of separate parts that can be joined together to form a larger object: refers to made from a set of separate parts that can be joined together to form a larger object: The terms "constrict" and "narrow" refer to a funnel-like structure configured to direct insects, air flow and other things in a certain direction from a wider space into a less wide space. Also, the term 'electrocution' refers to a mostly lethal electrical event based on the amount of current passed through an insect or other animate thing disposed between two voltage points on an electrocution screen. Also, the term UAVD refers to an unmanned aerial vehicle drone and in the present disclosure is synonymous with drone or UAV Drone etc.

This invention is directed to agricultural pest control, prevention of hailstones that can damage crops, dislodge roof top snow, pollinate plants, control avalanche formation, eradicate flying pests, condition indoor polluted air, corral fallen tree leaves, control algae growth and to recreational fishing applications.

The present disclosure does not use chemical spray to eradicate harmful pests. This is a step in the right direction to deal with the environmental impact of sprays. The disclosure uses acoustic waves which cause targeted pests and unwanted creatures to move out from the drone patrolling area. The present disclosure evicts targeted pests via high energy acoustic wave generators which produce powerful acoustic wave vibrations to dislodge pests from leaves.

The present disclosure also uses lethal force via high energy acoustic waves with frequencies tuned to cause targeted pests to disruptively resonate. Acoustic waves put mechanical pressure upon a pest's body and organs in close distance leading to a rupture of body membranes and separate organs, therefore eradicating pests as a result.

The present disclosed drone hovers close to a bedding mattress, bombards it with lethal high energy acoustic waves to exterminate bedbugs. Hotel owners can rent out the disclosed unit immediately without waiting as compared to using methods of spraying with chemicals.

Another advantage of the disclosed drone includes notification to and communication with a local Doppler radar stationed nearby. The drone flies close to a storm cloud to bombard it with high energy acoustic waves to breakup dense clouds and prevent hail from forming therein. The disclosed drone hovers close to snow pack on sloped hills in order to bombard the snow pack with high energy acoustic waves to loosen and remove piled-up snow pack and control avalanches without the use of explosives. Still another advantage of the disclosed drone includes hovering over rooftops blasting snow with acoustic waves to dislodge snow and eliminate the need for a human to climb to a rooftop to dislodge and to remove snow pack.

Still another advantage of the disclosed drone is to hover over plants and blast the plants with acoustic waves and thereby help plants pollinate themselves and improve crop yield. Still another advantage of the disclosed drone equipped with a high velocity and a high-volume air blower is to help pollinate plants thereby. Another advantage of the disclosed drone is to electrocute airborne flying insects with high voltage electrified screens.

Another advantage of the disclosed drone is to refresh interior rooms through showering negative ions into the rooms via the drone. Negative ions are reported to improve health and are therefore showered into the rooms via the disclosed drones. Another advantage of the disclosed drone is to move indoor air through a set of electrostatically charged plates to purify polluted air. Another advantage of the disclosed drone is to shower indoor rooms with Ozone (O3) molecules that remove odors. Still another advantage of the disclosed drone is to irradiate high energy Ultra Violet-C rays to kill germs and bacteria.

The acoustic generator causes plants to vibrate and resonate at frequencies that simulate insects visiting the plants. Another advantage of the disclosed drone equipped with a high velocity and a high-volume air blower is to clear fallen tree leaves from roof tops and heretofore unreachable areas thereby.

Still another advantage of the disclosed drone is to operates from remote manual control via Wi-Fi or to operate autonomously without the presence of human involvement. A remote operator monitors drone's activity through the drone's cameras via FPV (First Person View) at a distance to assure safety.

The drone is modularly designed. The drone primary body consists of basic propellers and components necessary for airborne lift and travel. The detachable and interchangeable modules include high voltage screens, particle collector plates, electric field plates, ultra violet light, ozone generators, air blowers, side mounted acoustic generators and bottom mounted acoustic generators. Modules are fixed on the drone body or can be descended from the drone body via cable and a winch.

FIG. 1 is the multi-function drone 10 that equipped with motor 50 drives propeller 51 installed on the motor shaft 54 according to an embodiment of the present disclosure. The motor 50 is mounted on support frame 53. A drone computer CPU 33 communicates with GPS device 35 and Wi-Fi wireless unit 34 and 360 degree obstacle avoidance device 23 with information feeds from video camera 20. Antenna 22 sends and receives data to its remote controller 120. Dedicated battery 37 only serves the drone while battery 40 powers all accessories such as cartridge assembly 100 which including tone synthesizer module 41, high voltage generator modules 58, 60, and 70. The cartridge assembly 100 comprises particle collectors module 61, UV-C LED module 80, negative ions generator module 71 and Ozone generator module 90. The cartridge assembly 100 can be removed if not being used by loosening up mounting nut 101. The removed cartridge assembly 100 creates a cavity in a bottom section of drone 10 designed to receive a high energy acoustic wave generator 44 shown in FIG. 9, FIG. 11 and FIG. 12. In addition to the bottom fire acoustic wave generator 44, there is an array of sideways mounted articulate acoustic wave generators 42. Sideways mounted generators 42 allow more freedom to aim at a target being treated such as above and the peripheral of the drone 10. The disclosed drone is also equipped with a cage 59 including the high voltage screen 55 and 56 protected by an isolated screen 57 which guards against accidental electric shock when cage 59 is electrified. The drone further comprises power battery recharge contact tips 19 at the ends of support legs 18.

Figure 2:
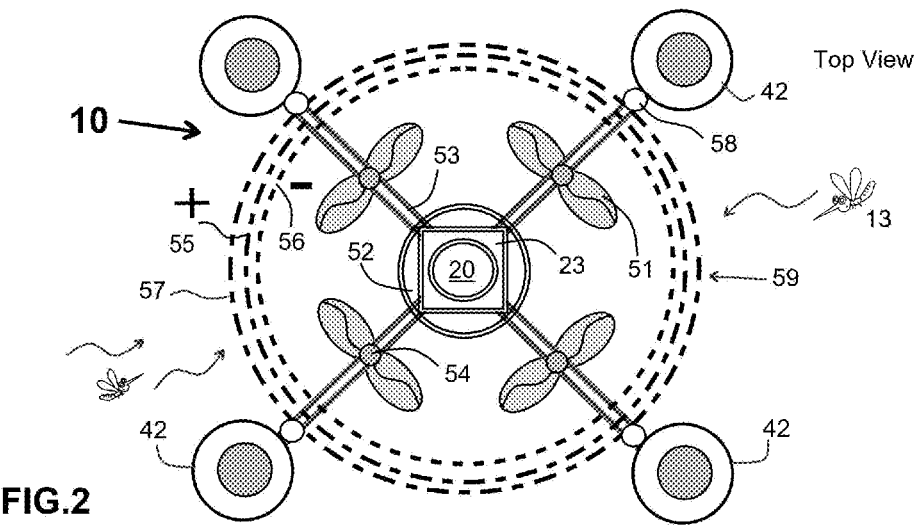
FIG. 2 is top view of the drone in accordance with an embodiment of the present disclosure.

Turning to FIG. 2 is the drone 10 view from its top according to an embodiment of the present disclosure. The cage 59 is constructed with three-layer screens 55, 56, 57 supported by frame 53. A case 52 houses all drone 10 accessories protect from weather. Acoustic wave generators 42 installed with articulated joints 58 can be pointed to any direction away from drone 10 for taking aim at targets.

Figure 3:
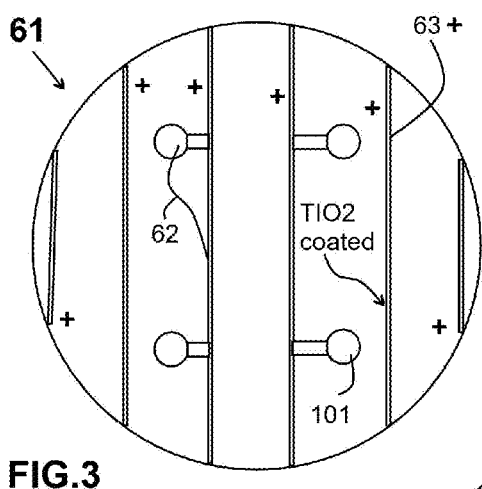
FIG. 3 is top view set of positive plates of particles collector module taken out from the cartridge assembly in accordance with an embodiment of the disclosure.

Depicted in FIG. 3 is a photocatalytic oxidation particles collector module 61 forming with rows of spaced apart according to an embodiment of the present disclosure. A Titanium Oxide (Tio2) coated positively charged plate 63 (FIG. 3) and negatively charged plate 64 (FIG. 3A) are configured for filtering polluted air. When UV-C light 80 shines on the titanium dioxide, electrons are released at its surface. The electrons interact with polluted water molecules (H2O) in the air pulled in from the drone propeller 51. The pollutant molecules are broken apart at chemical bonds and turned into harmless substances such as carbon dioxide and water.

Figure 3B:
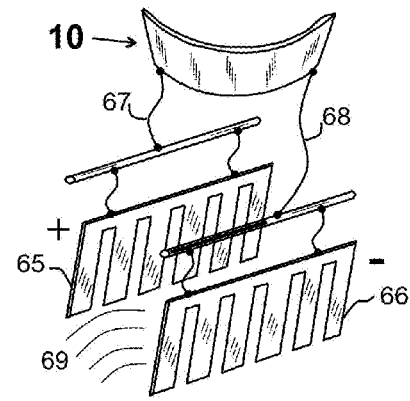
FIG. 3B is perspective view shows a pair of electric field plates immerses in water to Immobilize fishes in accordance with an embodiment of the disclosure.
Figure 3A:
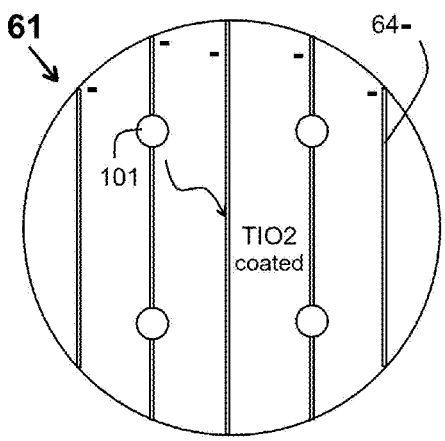
FIG. 3A is top view set of negative plates of particles collector module taken out from the cartridge in accordance with an embodiment of the disclosure.

FIG. 3B shows drone 10 carrying a pair of electric field plates 65 and 66 immersed in water for catching fishes according to an embodiment of the present disclosure. The plates 65, 66 are powers by electrical wires 67, 68. When electric power is turned on, causing electric field 69 spanning from plates 65 to 66. Small fishes swimming in the electric field 69 area between the plates can be stunned and immobilized. The Fish catcher simply picks up the stunned and immobilized fishes.

Figure 4:
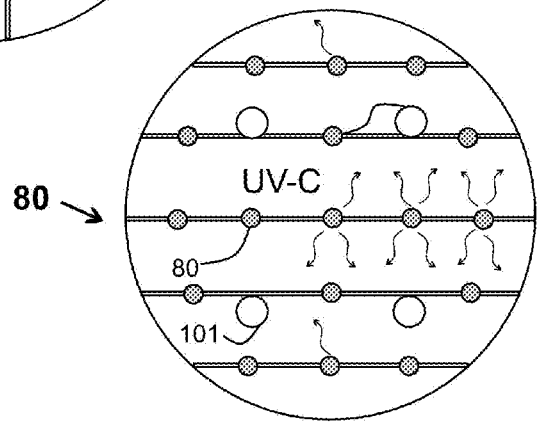
FIG. 4 is top view of Ultra Violet-C LED module taken out from the cartridge for killing germs in accordance with an embodiment of the disclosure.

FIG. 4 is an array of Ultra Violet-C spectrum LED module in accordance with an embodiment of the present disclosure. The module 80 is used for activating the (TiO2) coatings on the particles collector plates 63, 64 and irradiating germs and bacteria presented on air and surfaces of the plates.

Figure 5:
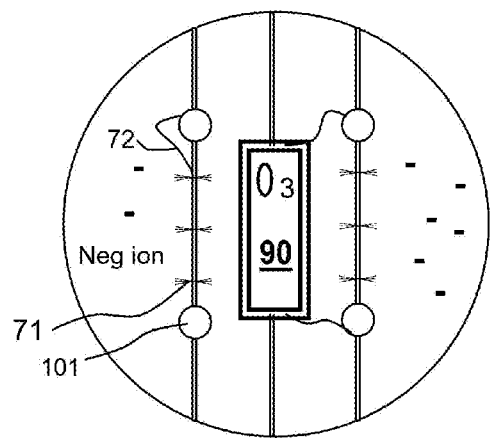
FIG. 5 is top view of negative ions and Ozone generator module taken out from the cartridge in accordance with an embodiment of the disclosure.

FIG. 5 shows a negative ions generator module 71 with high voltage supplied thereto via high voltage inverter 70 through cable 72 in accordance with an embodiment of the present disclosure. An Ozone generator module 90 when activated can remove odors inside a room preferably without the presence of a human inside when it is turned on.

Figures 6, 7:
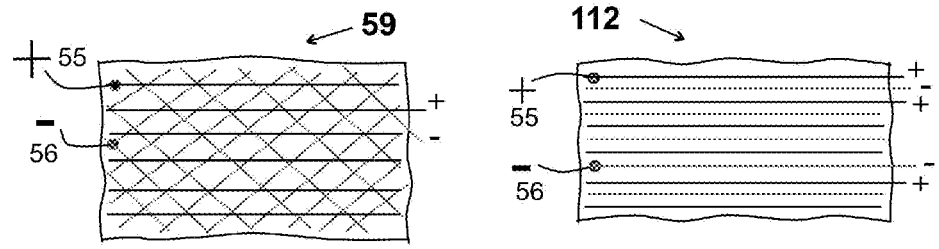
FIG. 6 is elevation view of a double layer electrified high voltage screen in accordance with an embodiment of the present disclosure.
FIG. 7 is elevation view of a single layer electrified high voltage screen in accordance with an embodiment of the present disclosure.

Returning back to drone 10 equipped with an electrified cage 59. A double layer screen 59 shown in FIG. 6 comprises oppositely charged screens 55 and 56 to electrocute flying insects 13 in accordance with an embodiment of the present disclosure. A variation of a high voltage design with a single layer electrified cage 112 is shown in FIG. 7 serving the same purpose in accordance with an embodiment of the present disclosure.

Figures 8, 9:
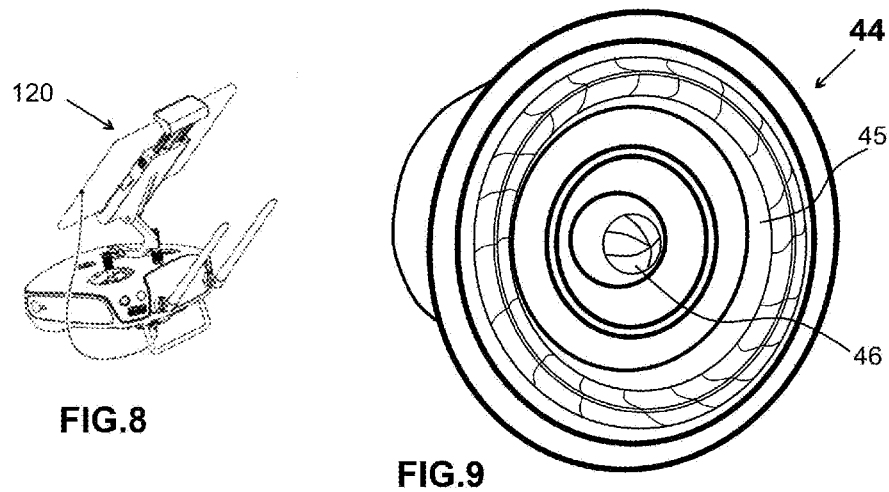
FIG. 8 is perspective view of a remote-control station in accordance with an embodiment of the present disclosure.
FIG. 9 is wide bandwidth from infrasound to ultrasound high energy acoustic wave generator in accordance with an embodiment of the disclosure.

Turning to FIG. 8, a remote-control base 120 is shown in accordance with an embodiment of the present disclosure. Base 120 monitors through its video monitor the progress of the distanced drone 10 activities and send commands to an override drone in case of emergency. Base 120 communicates with drone 10 via its Wi-Fi wireless connection. A modern smart-phone can be substituted for the base 120 for convenience or design.

A powerful, bottom mounted high energy acoustic wave generator 44 is shown on FIG. 9 in accordance with an embodiment of the present disclosure. Generator 44 is similar to side mounted acoustic wave generators 42. Generator 44 is dedicated for blasting acoustic wave in downward direction while generators 42 are blasting from side and in upward and downward direction. Generator 42 and 44 are driven with acoustic power amplifier 43 which tonal frequency and characters are programmed by synthesizer 41. Generators 42 and 44 are made of multi elements driver 45 for low frequencies and 46 for high frequencies that can respond to reproduce wide range of frequencies from infrasound to ultrasound.

Figures 10, 10A:
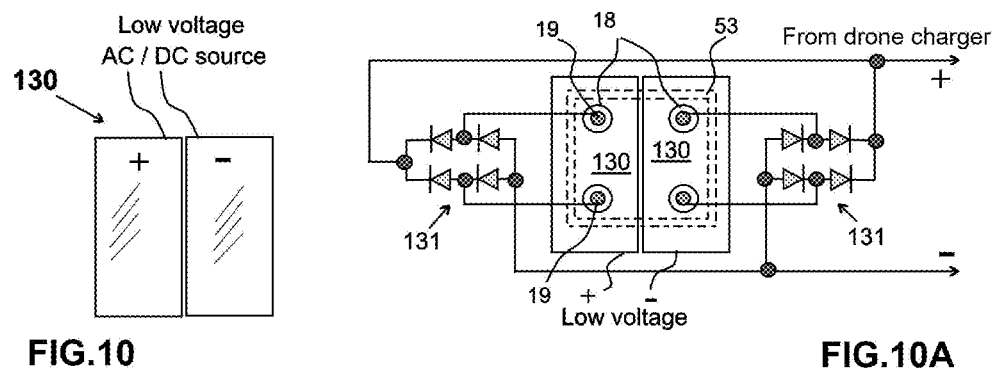
FIG. 10 is drone charge station with conductive pads in accordance with an embodiment of the disclosure.
FIG. 10A is schematic diagram of a drone battery charging circuit in accordance with an embodiment of the disclosure.

An automatic charge station 130 is provided for landed drone 10 to recharge its batteries shown on FIG. 10 in accordance with an embodiment of the present disclosure. FIG. 10A is a circuit diagram showing a drone 10 landed on the charge pad 130 in accordance with an embodiment of the present disclosure. Drone 10 has built-in bridge rectifiers 131. On the ends of support legs 18 are electric conducting tips 19. After the drone 10 lands, electric power will flow from the pad 130 to recharge the batteries 37 and 40. The drone 10 landing orientation is not critical since the drone's rectifiers 131 will electrically auto correct respective polarities.

Figure 11:
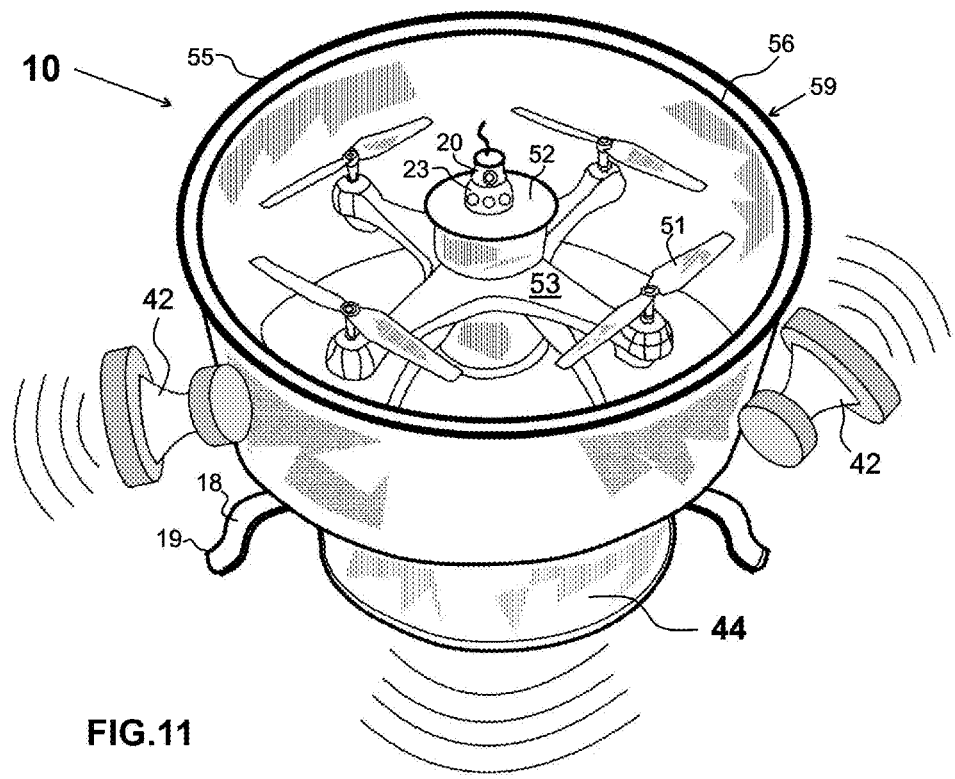
FIG. 11 is perspective view of mounted acoustic wave generators on multi-function drone in accordance with an embodiment of the present disclosure.

A perspective view of the drone 10 is shown on FIG. 11 in accordance with an embodiment of the present disclosure. Visible devices include high voltage cage 59 and sideways mounted acoustic wave generators 42 that can point to multiple directions away from cage 59. A downward fired acoustic wave generator 44 blasts powerful acoustic waves in the downward direction shown.

Figure 12:
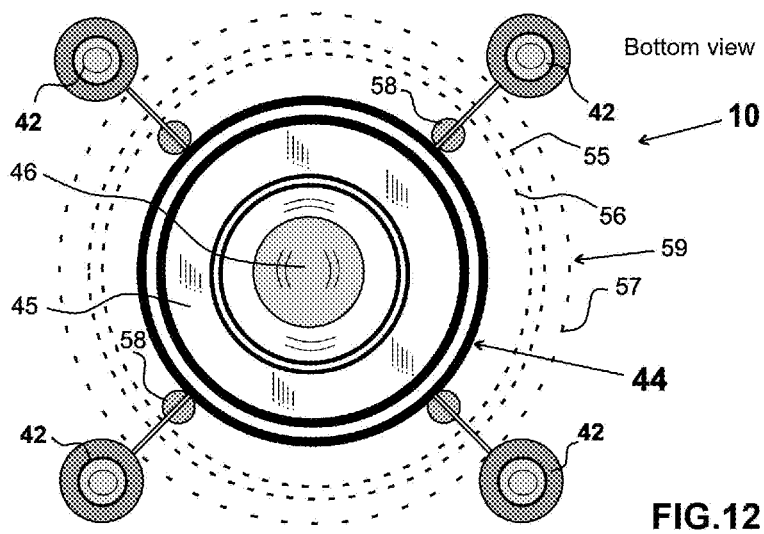
FIG. 12 is bottom view of mounted acoustic wave generators on multi-function drone in accordance with an embodiment of the present disclosure.

Looking upward from a bottom of drone 10 is shown in FIG. 12 in accordance with an embodiment of the present disclosure. Electric shock protection screen 57 is installed on the outer layer of high voltage screen 55. Articulating joint 58 allow the sideways mounted acoustic wave generator 42 to swivel to designated directions. Infrasound driver element 45 and ultrasound driver element 46 are faced downward as shown on generator 44.

Figure 11A:
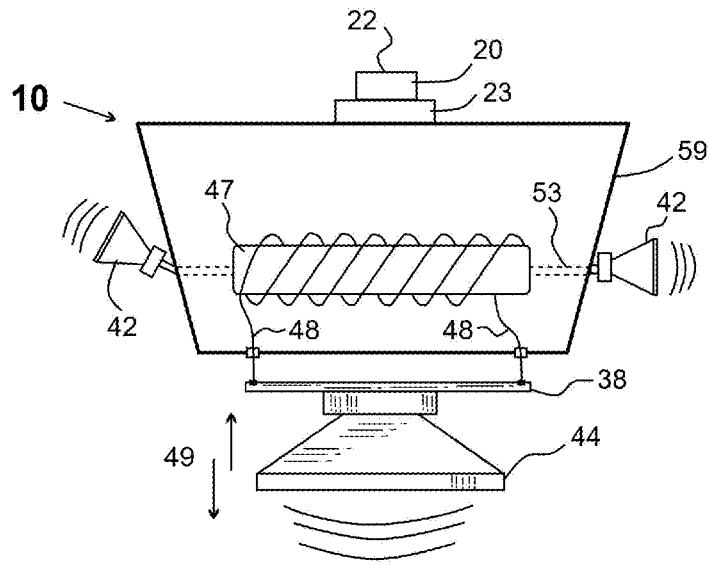
FIG. 11A is elevation view of drone refers to FIG. 11 showing acoustic generators placement, and bottom mounted generator can be descanted from drone body via cable and winch in accordance with an embodiment of the disclosure.

Shown in FIG. 11A is generator 44 taking up the cavity when cartridge 100 is removed in accordance with an embodiment of the present disclosure. A spool 47 winded with electric cable 48 suspends the generator 44 with a stabilizing bar 38 that prevents generator 44 from twisting the cables 48 when generator 44 is being lowered down from drone body 10. The generator 44 is waterproof. The generator 44 retracts into the cartridge cavity when operating on land. When drone 10 flies out to wet lands and lakes, generator 44 is lowered down and immersed into water for breaking up algae growth with its ultra sound element 46 within the generator 44 shown on FIG. 9. The generator 44 further comprises a microphone that picks up echo sounds from the generator 44 to determine the ultrasound frequency to improve its efficiency at breaking up algae growth among other things.

FIG. 12 is bottom view of mounted acoustic wave generators on multi-function drone in accordance with an embodiment of the present disclosure. Reference numbers shown may refer to same and similar components shown in other figures herein.

Figure 13:
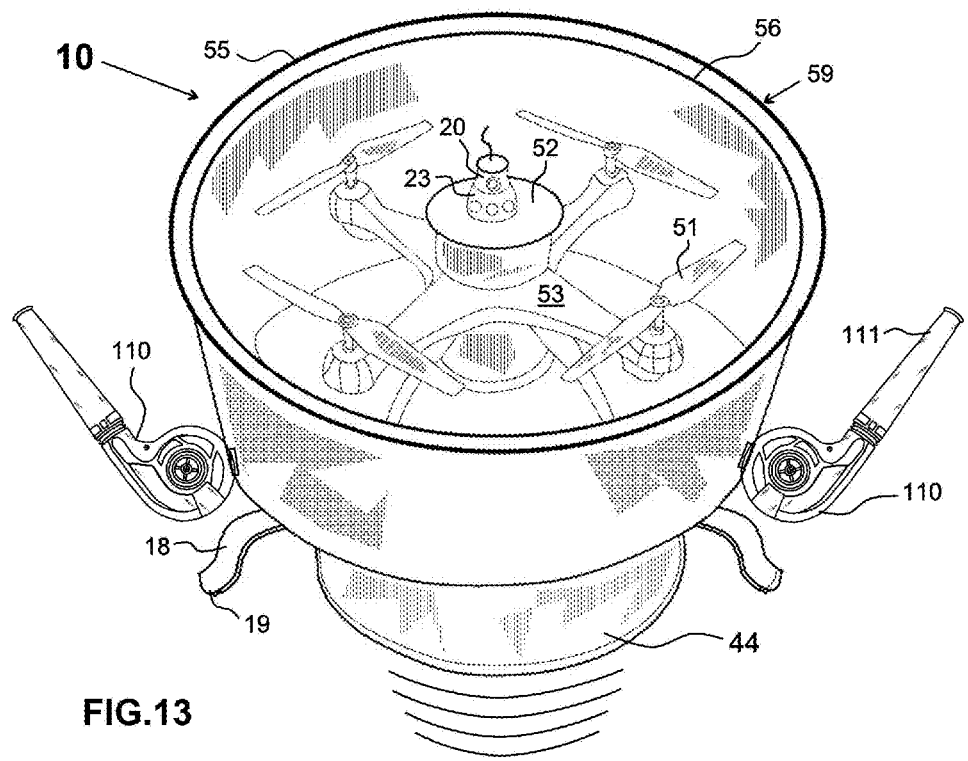
FIG. 13 is perspective view of drone mounted with air blowers in accordance with an embodiment of the disclosure.

A drone 10 depicted in FIG. 13 is equipped with a pair of high velocity and high-volume air blowers 110 in accordance with an embodiment of the present disclosure. The air blower 110 has a nozzle 111 which directs and boosts its air speed to clear fallen tree leaves and can also help pollinating plants to reproduce. In a plant pollination application, the air blower 110 blows high velocity air at plants while at the same time blasting acoustic wave from generator 44, 42. The pollen released from the plants get blown about and cross pollinates with other plants. The new cross-pollinated plants are genetically healthier and stronger than self-pollinated varieties.

Figure 14:
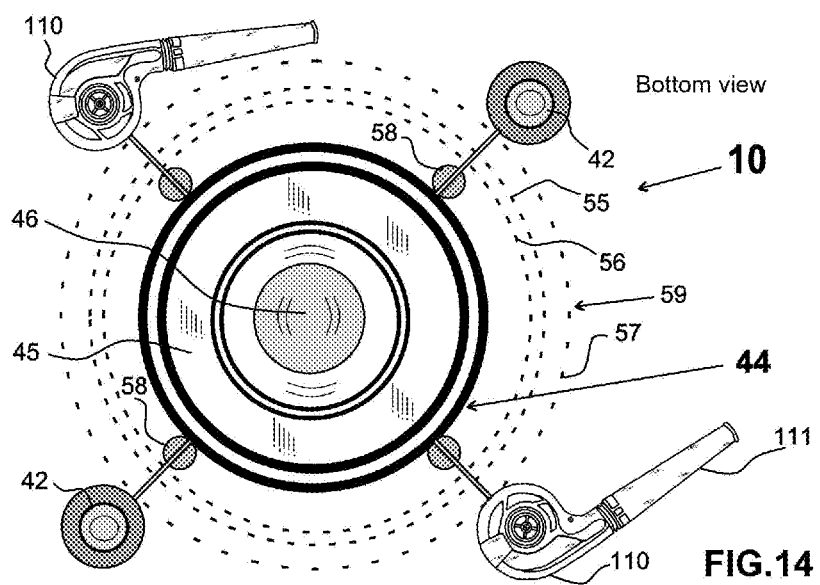
FIG. 14 is bottom view of drone showing a pair of air blowers mounted on side of drone in accordance with an embodiment of the present disclosure.

FIG. 14 is the bottom view of an air blower 110 equipped drone 10 in accordance with an embodiment of the present disclosure. A single air blower 110 is sufficient for a small area. The double air blowers 110 can corral tree leaves over a wider area for easy collecting and processing or disposal.

Figure 15:
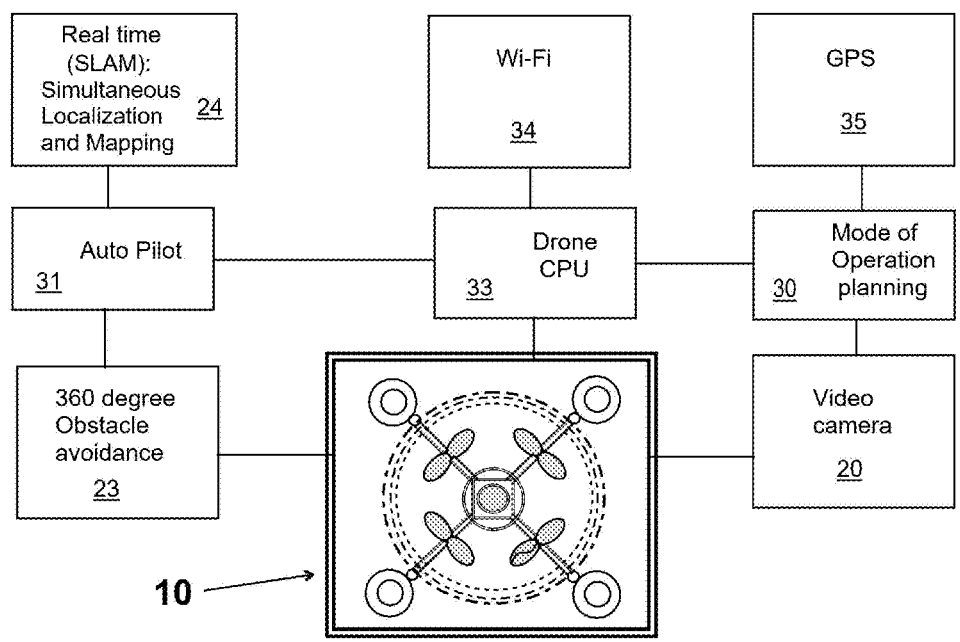
FIG. 15 is block diagram of intercommunication and connection of drone in accordance with an embodiment of the present disclosure.

FIG. 15 is a block diagram of communication and interconnection within the drone 10 in accordance with an embodiment of the present disclosure. Drone 10 uses real time Simultaneous Location and Mapping (SLAM) 24 and 360 degree obstacle avoidance 23 coupled with video camera 20 and three dimensional laser scanning to help its auto pilot 21 capabilities. Mode of operation planner 30 redirects a drone CPU 33 for new tasks by activating appropriate modules 43, 58, 70, 60, 90, 80, 110 etc.

Figure 16:
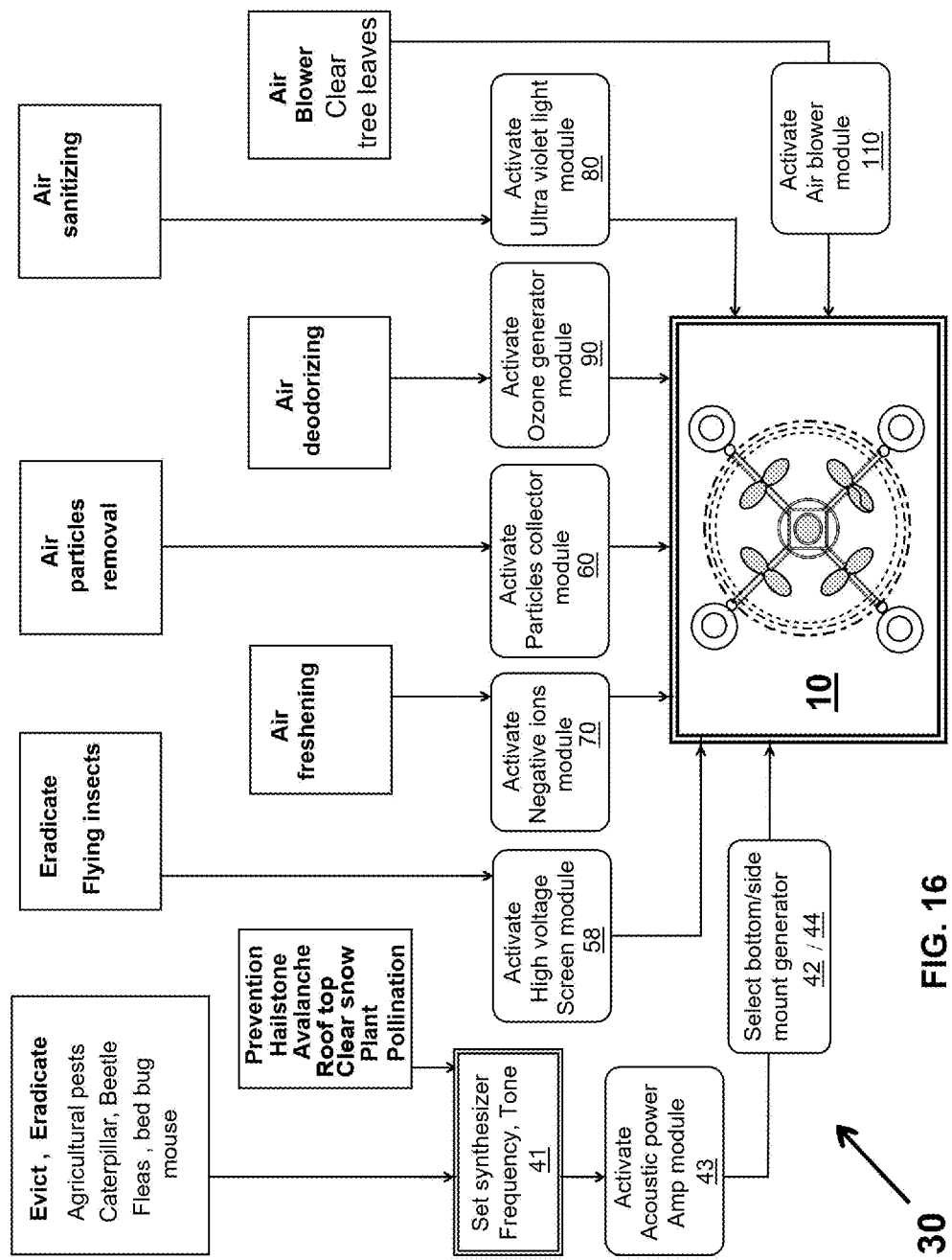
FIG. 16 is modes and methods of operating a multi-function drone in accordance with an embodiment of the present disclosure.
Figure 17:
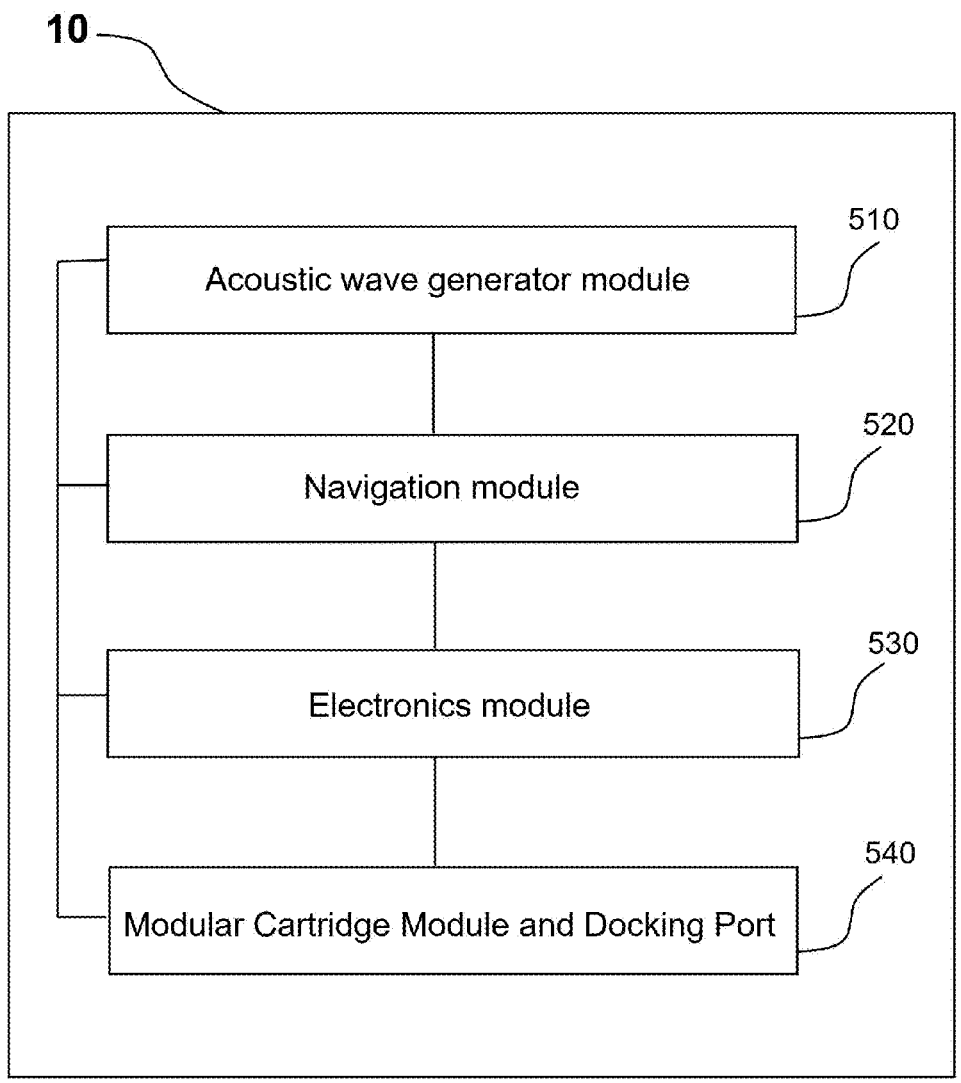
FIG. 17 is a block diagram of the system modules of the present disclosure in accordance with an embodiment of the present disclosure.

Another block diagram depicts the operation planner 30 in FIG. 16, including a method of operating the multifunction drone 10 in accordance with an embodiment of the present disclosure. For example, agricultural pests are evicted via a first step to identify a type of pest by comparing a target pest to pests in onboard stored data. A second step includes selecting a proper tone and frequency from synthesizer 41. The third step includes instructing the drone 10 to hover close to the pest but avoid making contact with the plants. Upon power-up, the acoustic wave generator 44 should be able to dislodge pests due to strong vibrations created by the acoustic wave generator 44. The camera 20 and CPU 33 monitor the eviction process to determine if other measures are needed, for example in the event pests are still holding on the plants. Then the synthesizer 41 will sweep a range of frequencies to match the natural resonant frequency of the pest. Once the pest starts resonating, death of pest will result. For example, a typical Beetle pest resonates at 500 to 2000 hertz. The frequency is chosen dependent on the size and mass of the pest. A typical way to determine the frequency is $\frac{1}{2}\pi \times \sqrt{k/m}$ where m is mass of the pest and the constant $k=8.86 \times 106$ N/m.

Generally, a cricket resonates at 3.27 kHz and a caterpillar resonates at a much lower frequency. Indoor bedbugs are blasted with the high energy acoustic wave generator 44 by drone 10 hovering close to the bedding surface. The powerful acoustic waves induce vibration and resonate the bedbugs to death by cellular disruption.

The disclosed drone 10 hovers close to a snowpack for blasting with the powerful acoustic wave generator 44 configured to loosen up under layers of snowpack and thereby control avalanches. The drone 10 is also guided by Doppler radar to fly up to meet approaching storm clouds. The drone then blasts the storm clouds with powerful acoustic wave generators 42 and 44 to breakup potential hailstones from forming before the damaging storm reaches its patrolling area. A Hail Cannon is one method using shockwave generators on ground level to shoot upward into the sky to disrupt the formation of hailstones in their growing phase. An explosive charge of acetylene gas & air fired in the chamber of the machine creates a disruptive shockwave. However, the hail cannon method is not cost effective since it loses most of its energy by the time its shockwave reaches the clouds.

During the eviction process on beetle and caterpillars, drone 10 also encounters flying insects evacuated from the plants. The drone 10 switches on a high voltage inverter 58 to electrify a screen cage 59 to kill the insects when they make contact with the screen 55 and 56.

Inside a room, the flying drone 10 switches on a high voltage inverter 70 that activates the ionizer emitter 71 to produce negative air ions that collide with suspended particles and give them a charge. The drone 10 flies and moves air in and out through its propellers 51. Charged particles aggregate together and fall out of the air, thereby disinfecting the atmosphere and stopping the transmission of infection. Ultra violet-C Light 80 in addition, is used to eliminate germs, viruses, bacteria, allergens and disease-causing microbes.

For larger particles inside a room, the drone 10 switches on the high voltage inverter 60 that activates the particle collector 61. The collector 61 comprises a positive plate 63 which attracts negatively charged particles and the negative plate 64 which attracts positively charged particles. Plates 63 and 64 are removable from the cartridge assembly 100 for periodic cleaning.

From inside, such as hotel room, the drone 10 flies and switches on the Ozone generator 90. The Ozone generator 90 destroys the smoke molecules that are left behind that cause offending odors.

An unmanned multi function aerial vehicle drone (UAVD), comprises an insect eradication module comprising at least one propeller and one of a electrocution screen and; a control and communications module comprising an electronic central processing unit (CPU), a wireless communication unit, an electronic camera and audio A/V unit and a bus configured to interconnect all drone modules. The UAVD also includes a navigation module comprising a set of 360 degree obstacle avoidance sensors and positioning unit (GPS) configured to autonomously direct the drone to avoid obstacles while in flight; high voltage inverters that power the cartridge modules; frequency synthesizer that drives acoustic wave generator.

An embodiment of the unmanned UAVD includes an electrocution screen in a cylindrical cage configuration to have a top opening larger than a bottom opening and the wall there between is slanted inward from the top to the bottom to allow deceased insects to quickly fall off the cylindrical cage. The cylindrical cage comprises two layers of metal screens spaced apart and an insulation there between to prevent the screens from making physical contact wherein a mesh size of an exterior screen opening is larger than a mesh size of an interior screen opening. The unmanned UAVD includes the cylindrical cage comprising a single layer metal screen formed by two separate metal wires wrapped around an insulation core in a spaced apart interleaved fashion, where each wire at any point with respect to its neighboring two wires is oppositely energized. An electrically non-conducting cage guard surrounds an exterior of the electrocution screen, defining openings which are larger than the mesh openings of the electrocution screen to allow an insect to fly there through.

Other embodiments of the unmanned UAVD includes the camera broadcasts in real time video and images back to a remote controller base via P2P, FPV, RPV formats and the like and stores images on the drone for real time analysis of intended targets using object recognition tracking as well as color histogram software to distinguish which types of insects are being targeted. A set of 360 degree obstacle avoidance sensors (OAS) comprise infrared or ultrasound sonar and three dimensional laser scanner with aid from the camera to alert the drone to autonomously avoid collisions with obstacles. A real time (SLAM) Simultaneous Localization and Mapping safe guard the drone from colliding on obstacles. A dedicated drone battery and an accessories battery pack ensure the drone reserves adequate energy to return to base. The battery packs are rechargeable with optional solar panels disposed on the drone or attachable thereto.

The unmanned UAVD includes a remote-control base station including joysticks, an antenna, a transponder, a radio transceiver, a video monitor, a drone status display, a microphone, a gyroscope, and a set of sensor calibration switches. The remote-control station is configured to be substitutable by a smart phone. The unmanned UAVD system also includes an electrical charging pad station that mates with tips of landed unmanned UAVD configured in two sections for a positive voltage and a negative voltage or alternated voltage, and the unmanned UAVD self contains a set of bridge rectifies configuration configured to allow a completed charging circuit from the pad to battery on unmanned UAVD in any orientation when the unmanned UAVD landed. A removable cartridge houses a variety of specific functional modules for specific applications. Modules can be repurposed or unplugged from the cartridge. The cartridge comprises a spaced apart particle collector module which comprises positive and negative charged plates to collect pollutant in the air. The plates are coated with Titanium Oxide (Tio2). A spaced apart electric field anode and cathode plate module are included in embodiments.

Embodiments include plates suspended beneath the drone with electric cables that wind onto a spool. A winch drives the spool to raise or lower the plates immersed into water to stunt fishes when within the electric field affected area. The cartridge comprises an Ultra violet-C light spectrum module that irradiates germs and bacteria presented on passing air pulled in from the drone's propellers and surfaces of Titanium Oxide (Tio2) coated particle collector plates. The cartridge also comprises a negative ions generator module. Enough negative ions are released from its emitters attaching to positively charged particles in large numbers. This causes germs, mold, pollen and other allergens to become too heavy to stay airborne and precipitate out of the air onto the plates or elsewhere.

The cartridge also comprises an Ozone generator module. The module oxidizes unwanted odors in confined spaces. The ozone generator creates O3 which molecularly attacks odor in the space to be treated by flight of the drone and impelling air via its flight and impellers. The acoustic wave generator module comprises sideways mounted generators and bottom mounted generators. Sideways mounted generators have articulated swivel joints that allow generators blasting their acoustic wave energy away from the drone in any direction. Bottom mounted generators blast acoustic wave energy in a downward direction. Embodiments of the unmanned UAVD system further comprise infrasound and ultrasound elements integrated within the acoustic wave generator module. Infrasound blasts via very low resonant frequencies on an object and ultrasound blasts via high resonant frequencies on an object.

The unmanned UAVD system further comprises a winch driving a spool wound with electrical cables. One end of the cable terminates at stabilizer bars holding a bottom mounted generator. The cables raise or lower the bottom generator immersed in polluted water to breakup algae growth. The unmanned UAVD system further comprises a microphone that pickup echoed signals to determine setting output power level for the immersed bottom generator.

The unmanned UAVD system further comprises an air blower module configured to blow away lighter objects which yield to air pressure. The air blower can be in pair or multiple numbers to counter act the drone from spinning when the blower is powered up. The drone insect eradication module also comprises at least one electrocution screen. Methods for blasting a nest of insects and blasting a house's interior walls and floor with air via the drone's propellers and forcing all insects to become airborne for eradication are included in an embodiment of the present disclosure. The methods also include eradicating agricultural pests via a drone module comprising an acoustic wave generator. The methods further include hovering close to a target in order to blast the target from above and or from sides inducing strong vibrations causing the target to dislodge then fall to ground. The methods further include tuning the synthesizer frequency to closely match the natural resonant frequency of the targeted pests' body to induces strong vibrations creating death to the target. The methods further comprising infrasound and ultrasound elements built within the acoustic wave generator for the infrasound to produce very low frequency and the ultrasound to produce high frequency disruption. Methods further comprise aiming blowers at some angles while advancing the drone forward blowing leaves to a pile for later collection.

Other embodiments include tuning a synthesizer frequency to cause plants to resonate and release their pollens. Air blower forces pollens fly to neighboring plants to induce pollination. Regarding Algae control, the Drone hovers and drags the disruptive generator plates via cables along lakes or ponds to dislodge algae and to stun fish.

Embodiments also include a method for air freshening, air particles removal, air deodorizing and air sanitizing, via drone modules comprising a negative ions generator, particles collector, Ozone generator and ultraviolet light.

The method further comprises flying the drone inside a house to suck in air though its propellers. Air passing through the modules being refreshed with negative ions and particles are trapped in between plates and odor removed and air been sanitized.

The present disclosure uses an unmanned base flying vehicle drone fitted with high voltage electrified screens, chemical scents, lights, sound, a suction fan, video camera, global positioning system, Wi-Fi, docking beacon homing and tracking system. It is the most advanced tool to deal with this problem.

FIG. 17 is a block diagram of the system modules of the present disclosure in accordance with an embodiment of the present disclosure. The present disclosed system includes an acoustic wave generator module 510, a navigation module 520, an electronics module 530 and a modular cartridge module and docking port 540.

FIG. 18 is a cutaway diagrammatic illustration of a UAV Drone with a surrounding high voltage screen for killing flying insects in accordance with an embodiment of the present disclosure. The unmanned flying vehicle drone (UAV-Unmanned Aerial Vehicle) drone 10 is integrated with an insect killing apparatus including a gyroscope assisted, battery 37 powered, multi-propeller 51 driven flying drone. A cylindrical cage 60 surrounding the drone is electrified by a high voltage inverter module 36 configured for eradicating insects. The high voltage cage 60 is protected by a cage guard (not depicted) to prevent accidental touching. A camera with Wi-Fi 34, live streams video via an antenna 22 to a base station controller 200 (not depicted). A GPS (Global Position System) 35 sets a flight path to reach a destination and guides the drone 10 back to base.

A set of 360 degree obstacle avoidance sensors 23 and gyroscopes along with the camera 20 and onboard CPU (Central Processing Unit) 33 directs the drone 10 to avoid obstacles while in flight. The CPU 33 accepts apps (applications) available for download and updates. An attractant module 38 includes an Octenol and Lactic acid scented cartridge, a visible lighting module 32 and a CO2 (Carbon Dioxide) generator configured to attract insects to the UAVD in conjunction with the UV (ultra violet) light module 31. An acoustic sounder 39 or alarm is included to safeguard the drone 10 from being stolen when stationed on the ground and resting on the support legs 18.

A dedicated drone battery 37 and an accessories battery pack 40 ensure the drone 10 reserves adequate energy to return to base depending on an indicator signal or a timeout of a period of time. The battery packs 37 and 40 are rechargeable with solar panels (not depicted). A remote controller base station manages drone activities by communicating with the drone via WI-FI 34. Also depicted are a drone housing 52, a drone structural frame 53, a drone motor 50 and a drone motor shaft 54 for the drone propeller blades 51. The drone is integrated with a housing 52 and drone structural frame 53 structurally supports the high voltage cage 60.

A visible lighting module includes color changing LED (light emitting diode) 32 configured to generate a wide spectrum of stationary or flashing visible light, including reds, greens, and blues to mimic human activity to attract insects to fly closer and investigate. A stationary or flashing UV (Ultraviolet) light module 31 is included in an embodiment. The module has a convex reflector 30 that generates between 315 nm to 420 nm wavelength of UV light to attract insects. A CO2 (Carbon Dioxide) generator comprises the surface of the convex reflector 30 that is coated with TiO2 (Titanium Dioxide). The ultraviolet irradiates onto the convex reflector 30, causing release of CO2 to further attract insects.

FIG. 19 is a top elevational view of the UAV Drone of FIG. 18 for killing flying insects in accordance with an embodiment of the present disclosure. Reference numbers may be used for same and similar limitations to other figures contained in the present disclosure. The cage is depicted circular but may also be square, oval and spherical and other geometries depending on the application and design considerations. When an insect lands on a screen, the screens will bridge via the insect and cause a discharge current onto and through the insect, instantly electrocuting the insect. The mesh size of an exterior screen opening is larger than the mesh size of an interior screen opening to facilitate bridging. The top opening of the cylindrical cage is larger than its bottom opening, so the cage is slanted inward to allow deceased insects to quickly fall off the cylindrical cage.

FIG. 20 is a schematic view of a high voltage double layer screen for the UAVD in accordance with an embodiment of the present disclosure. The cylindrical cage 60 may include two layers of metal screens 62 and 64 that are spaced apart creating an exterior screen 62 and an interior screen 64. The screens may contain insulation material in between, such as plastic standoffs, to prevent the screens from making physical contact with each other. The exterior screen 62 is energized with positive potential voltage while the interior screen 64 is energized with negative potential voltage or vice versa.

FIG. 21 is a schematic view of a high voltage single layer screen for the UAVD in accordance with an embodiment of the present disclosure. An embodiment of the cylindrical cage may include a single layer of metal screen that is formed by winding two separate metal wires, wrapped around an insulation core in an interleaving fashion. The two interleaved wires are spaced apart, creating a parallel and alternating relationship that is energized with a positive and negative voltage placed across the respective wires. Therefore, each wire at any point with respect to its neighboring two wires is oppositely energized. When an insect lands on any wire, it will bridge the screen and cause a discharge current onto the insect, instantly electrocuting the insect. A top opening of the cylindrical cage is larger than its bottom opening, so the cage is slanted inward to allow deceased insects to quickly fall off the cylindrical cage. The cylindrical cage surrounds and encircles the drone body without touching the tips of the propellers spaced apart from the cage.

The cage guard is installed to surround the exterior face of the exterior high voltage screen. The guard is perforated with openings which are much larger than the mesh openings of the exterior screen to allow insects to fly there through. The guard is made from non-electrical conducting material to prevent accidental hand touching of the high voltage cylindrical cage.

A high voltage inverter module delivers high energy to the cylindrical cage. The positive and negative voltages are high enough to electrocute insects but not high enough to cause arcing between the screens. The high voltage is within a range of 450 to 10,000 volts.

A live video streaming camera broadcasts real time video and images back to its remote controller base station 200 via P2P, FPV, RPV formats and the like. The camera stores images on the drone for real time analyze of intended target by using facial and object recognition tracking as well as color histogram software. The camera is able to distinguish which types of insects are being targeted.

A set of 360 degree obstacle avoidance sensors include infrared or ultrasound (sonar) with aid from the camera to alert the drone in order to avoid collisions with obstacles.

An acoustic sounder announces prerecorded messages or relays real time message sent from remote base operator. The sounder warns intruders who come too close to drone landing site while the camera takes pictures around its vicinity immediately for future recovery if drone is stolen. The drone flies back to base if the warning message fails to deter the intruder. The controller sends a message through sounder and then sends a command to a kill switch to cause the drone to become inoperable if stolen. The sounder frequency ranges from infrasound to ultrasound. The sounder uses infrasound and ultrasound to repel unwanted targets.

Figure 22:
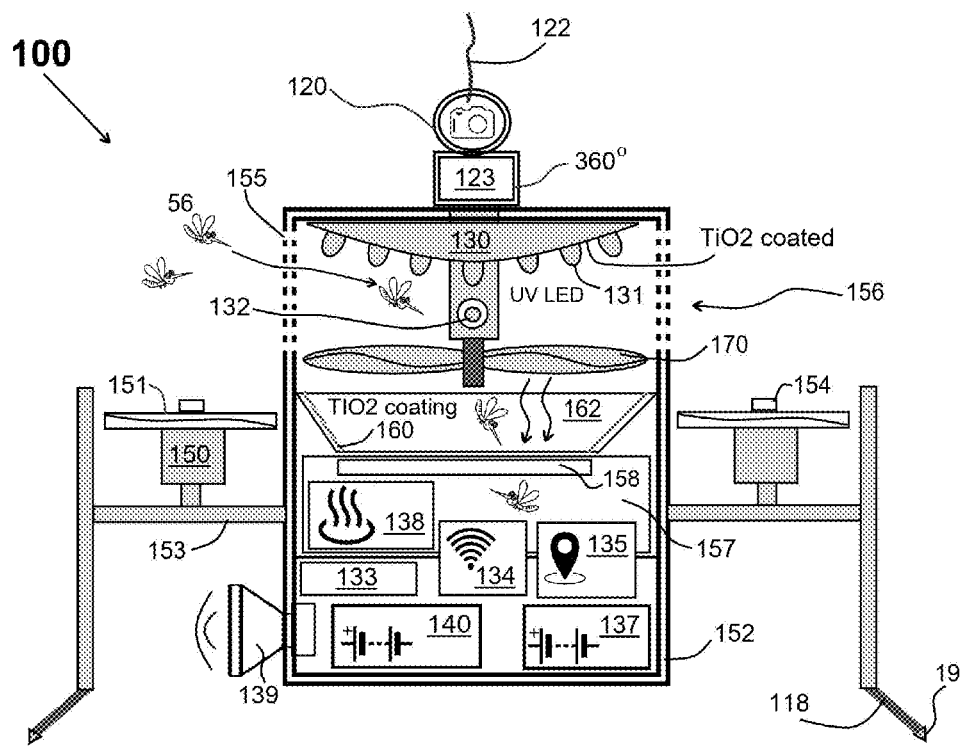
FIG. 22 is a cutaway diagrammatic illustration of a UAV Drone with a suction screen and impeller for killing flying insects in accordance with an embodiment of the present disclosure.

FIG. 22 is a cutaway diagrammatic illustration of a UAV Drone with a suction screen and impeller for killing flying insects in accordance with an embodiment of the present disclosure. The depicted drone 100, among other things, is a gyroscope assisted, battery powered, multi-propeller driven flying drone. A fan assisted suction trap is integrated into the drone 100 to eradicate insects. A fan shroud 162, routes insects into a one way trap 158 where the insects are trapped in a detachable tray 157. A camera 120 with Wi-Fi 134 streams live video via an antenna 122 to a base station controller 200 (not depicted).

A GPS (Global Position System) 135 sets a flight path to reach a predetermined destination and guides the drone 100 back to base. A set of 360 degree obstacle avoidance sensors 123 and gyroscopes (not depicted) along with the camera 120 and onboard CPU (Central Processing Unit) 133 directs the drone 100 to avoid obstacles while in flight. The CPU 133 accepts apps (applications) at a data port available for download and update. An attractant module 138 includes an Octenol and Lactic acid scented cartridge. A visible lighting module 132, a UV (Ultraviolet) light module 131, and a CO2 (Carbon Dioxide) generator are used to attract insects. An acoustic sounder 139 safeguards the drone 100 from being stolen when stationed on the ground. A dedicated drone battery 137 and a separate battery pack 140 for accessories ensures the drone 100 reserves adequate energy to return to base. The battery packs are rechargeable with solar panels (not depicted).

A fan 170 assisted suction trap pulls insects 56 into the trap 158 with directional air currents created by the rotating fan 170 when insects 56 fly close to trap for their investigation. The fan 170 runs on battery power. The suction fan 170 can be temporally switched off when drone 100 encounters beneficial insects. A fan shroud 162 directs captured insects to a one way trap 158 and holds them in a detachable tray 157 until they perish. The tray 157 is removable for cleaning. The shroud 162 is coated with TiO2.

Also depicted are a drone housing 152, a drone structural frame 153, a drone motor 150 and a drone motor shaft 154 for the drone propeller blades 151. The drone is integrated with the housing 152 and the drone structural frame 153 structurally supports the integrated components thereof. Additionally depicted are the suction grid 155, the air current direction 156, the TIO2 coating 160, the wireless transponder 180 and the hooked antenna 181.

The UAVD may be charged at home. A pad 80 sized to match the support legs 18 of the drone may be provided. When the drone 10, 100 lands on the pad 80, or is otherwise situated on the pad 80, an electric current starts to conduct through legs 18, 118 and rectify module 81 charging the batteries 37, 40, 137 and 140. The pad 80 is square and partitioned in two sections: one section for a positive voltage and the other section for a negative or ground voltage. Its surface is electrically conductive. Leg 18, 118 has at least a metal tip 19 for conduction.

Figure 23:
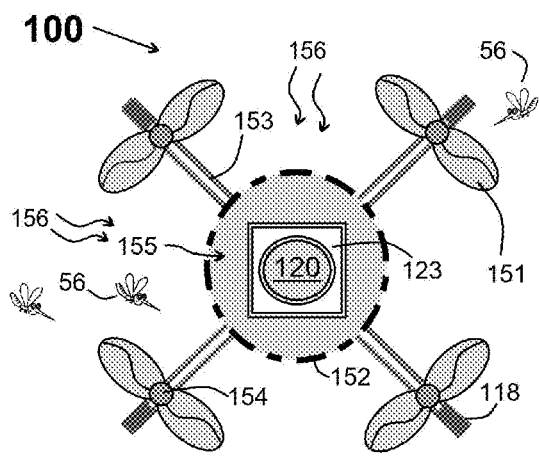
FIG. 23 is a top elevational view of the UAV Drone of FIG. 22 for killing flying insects in accordance with an embodiment of the present disclosure.

FIG. 23 is a top elevational view of the UAV Drone of FIG. 22 for killing flying insects in accordance with an embodiment of the present disclosure. Reference numbers may be used for same and similar limitations to other figures contained in the present disclosure.

Figure 24:
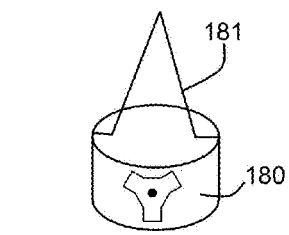
FIG. 24 is a perspective view of a beacon transponder with hooked antenna for the UAVD in accordance with an embodiment of the present disclosure.

FIG. 24 is a perspective view of a beacon transponder with hooked antenna for the UAVD in accordance with an embodiment of the present disclosure. The transponder beacon 180 helps precisely guide the drone 100 and 10 to a predetermined site. The transponder beacon 180 emits a radio frequency that is recognizable by the drone 10 and 100. The drone hovers closely to the beacon and can follow its owner/operator movement, thus providing an insect free pathway. The drone homes in to the beacon which was positioned earlier. The beacon also has a hooked antenna 181 which is extended upwards to conveniently attach to the drone and move to other locations.

The remote controller base station 200 manages drone activities. The controller communicates with drone via WI-FI. The transponder beacon helps precisely guide the drone to site; and the drone integrated with a housing that structurally supports the fan assisted suction trap. The housing provides ingress openings 155 large enough for insects being sucked in. The drone can be stationed indoor and outdoor and can fly autonomously or with an operator controller.

Figure 25:
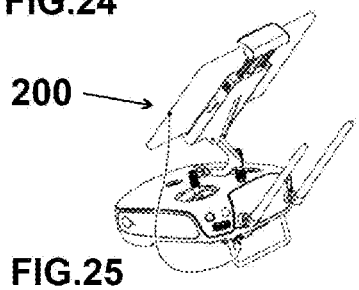
FIG. 25 is a perspective view of a base station controller and display for the UAV D in accordance with an embodiment of the present disclosure.

FIG. 25 is a perspective view of a base station controller 200 and display for the UAVD in accordance with an embodiment of the present disclosure. A remote-control base station comprises joysticks, an antenna, a transponder, a radio transceiver, a video monitor, a drone status display, a microphone, a gyroscope, and a set of sensor calibration switches. The remote-control station can be substituted with a smart phone.

Figure 26:
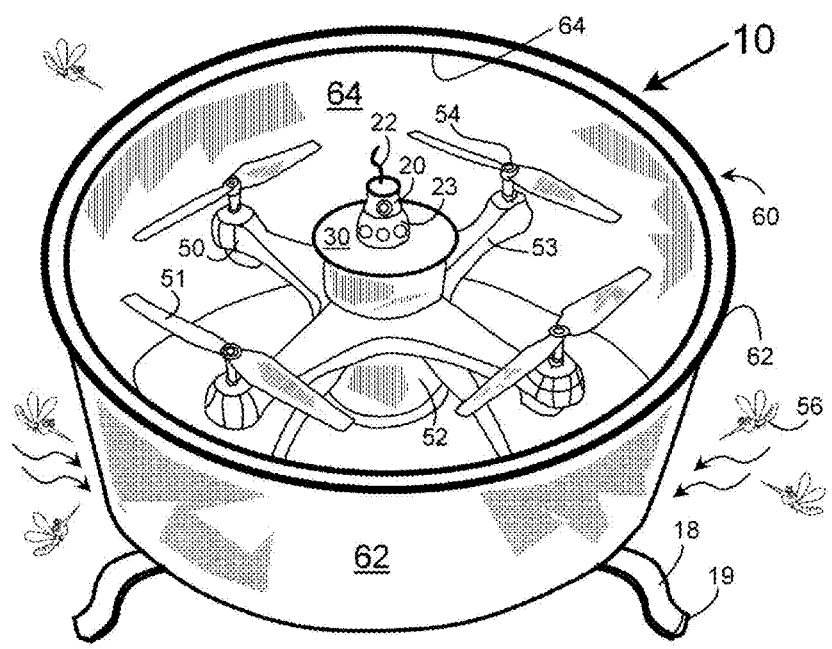
FIG. 26 is a top side perspective view of the UAV Drone of FIG. 1 in accordance with an embodiment of the present disclosure.

FIG. 26 is a top side perspective view of the UAV Drone of FIG. 18 in accordance with an embodiment of the present disclosure. Reference numbers may be used for same and similar limitations to other figures contained in the present disclosure.

Figure 27:
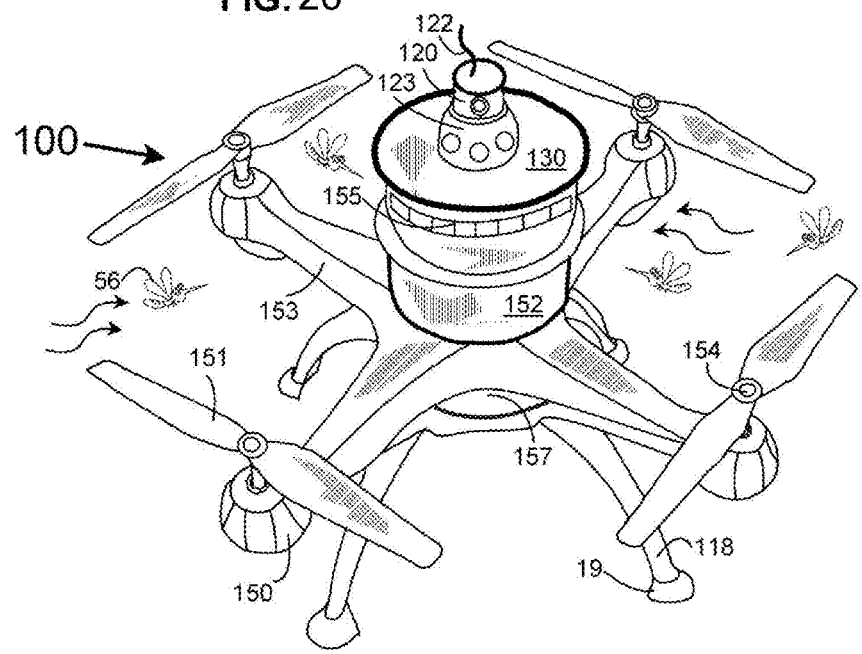
FIG. 27 is a top side perspective view of the UAV Drone of FIG. 22 in accordance with an embodiment of the present disclosure.

FIG. 27 is a top side perspective view of the UAV Drone of FIG. 22 in accordance with an embodiment of the present disclosure. Reference numbers may be used for same and similar limitations to other figures contained in the present disclosure.

Figure 28:
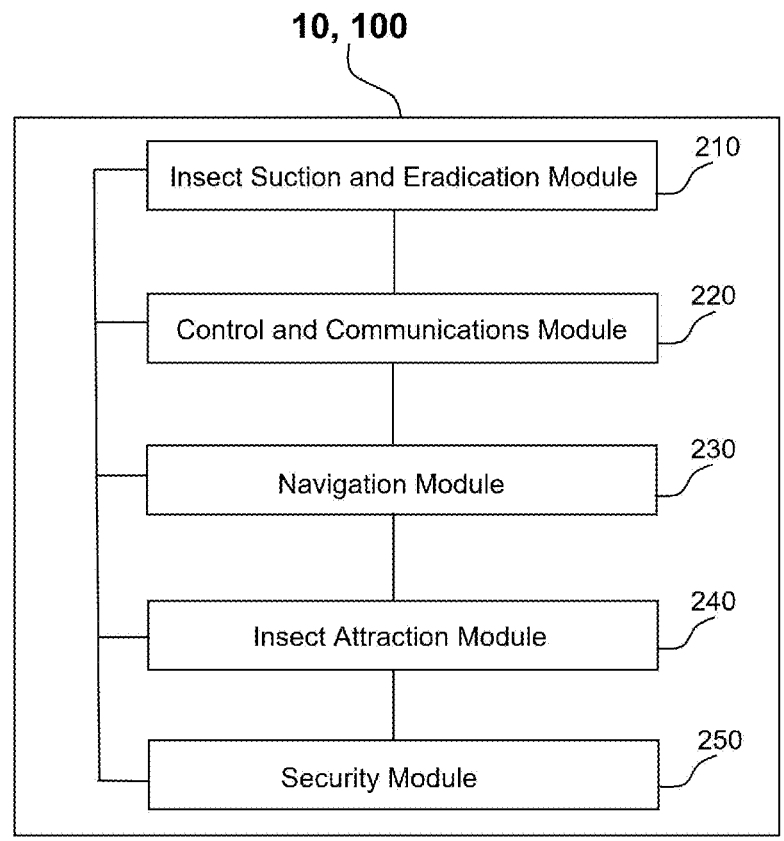
FIG. 28 is a block diagram of a UAVD adapted for eradicating flying insects in accordance with an embodiment of the present disclosure.

FIG. 28 is a block diagram of a UAVD adapted for eradicating flying insects in accordance with an embodiment of the present disclosure. The disclosed UAVD includes an Insect Suction and Eradication module 210, a Control and Communications module 220, a Navigation module 230, an Insect Attraction Module 240 and a Drone Security module 250 as disclosed herein. All drone modules are electrically interconnected via the Control and Communications module 220.

Figure 29:
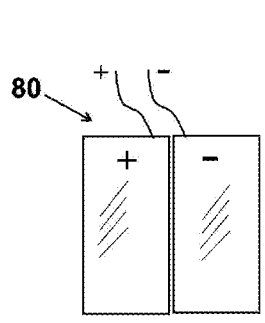
FIG. 29A is a top view of a drone charge pad in accordance with an embodiment of the present disclosure.
FIG. 29B is a schematic diagram of the drone charge pad including rectifiers in accordance with an embodiment of the present disclosure.
Figure 29:
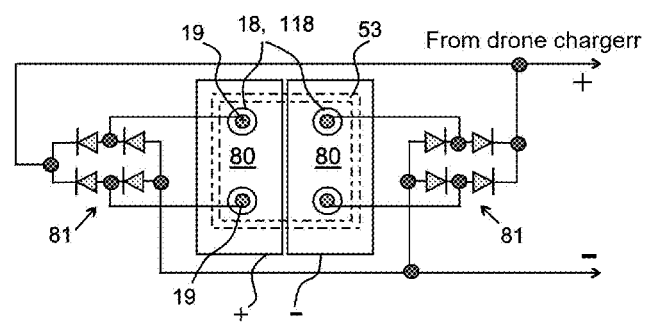

FIG. 29A is a top view of a drone charge pad 80 in accordance with an embodiment of the present disclosure. The unmanned UAVD system further includes a charge station at home base. A pad sized to match the support legs of the drone may be provided. When the drone lands on the pad, or is otherwise situated on the pad, an electric current starts to conduct through legs charging the batteries. The pad is square and partitioned in two sections: one section for a positive voltage and the other section for a negative or ground voltage. Its surface is electrically conductive. Each leg has at least a metal tip 19 for conduction.

FIG. 29B is a schematic diagram of the drone charge pad 80 including rectifiers in accordance with an embodiment of the present disclosure. The rectifiers 81 allow current to flow to the drone but do not allow any backwash current from the drone into the charging power supply. Thus, the drone may land in any orientation across the power supply pads and self-corrects or allows current to charge into the drone batteries. The double tapped diode or thyristor configuration allows a completed charging circuit from a positive terminal to a negative terminal through either a top diode or thyristor to a bottom diode or thyristor as depicted in the schematic. The rectifying circuits may be included in the charging pad circuits or in the drone itself.

Figure 30:
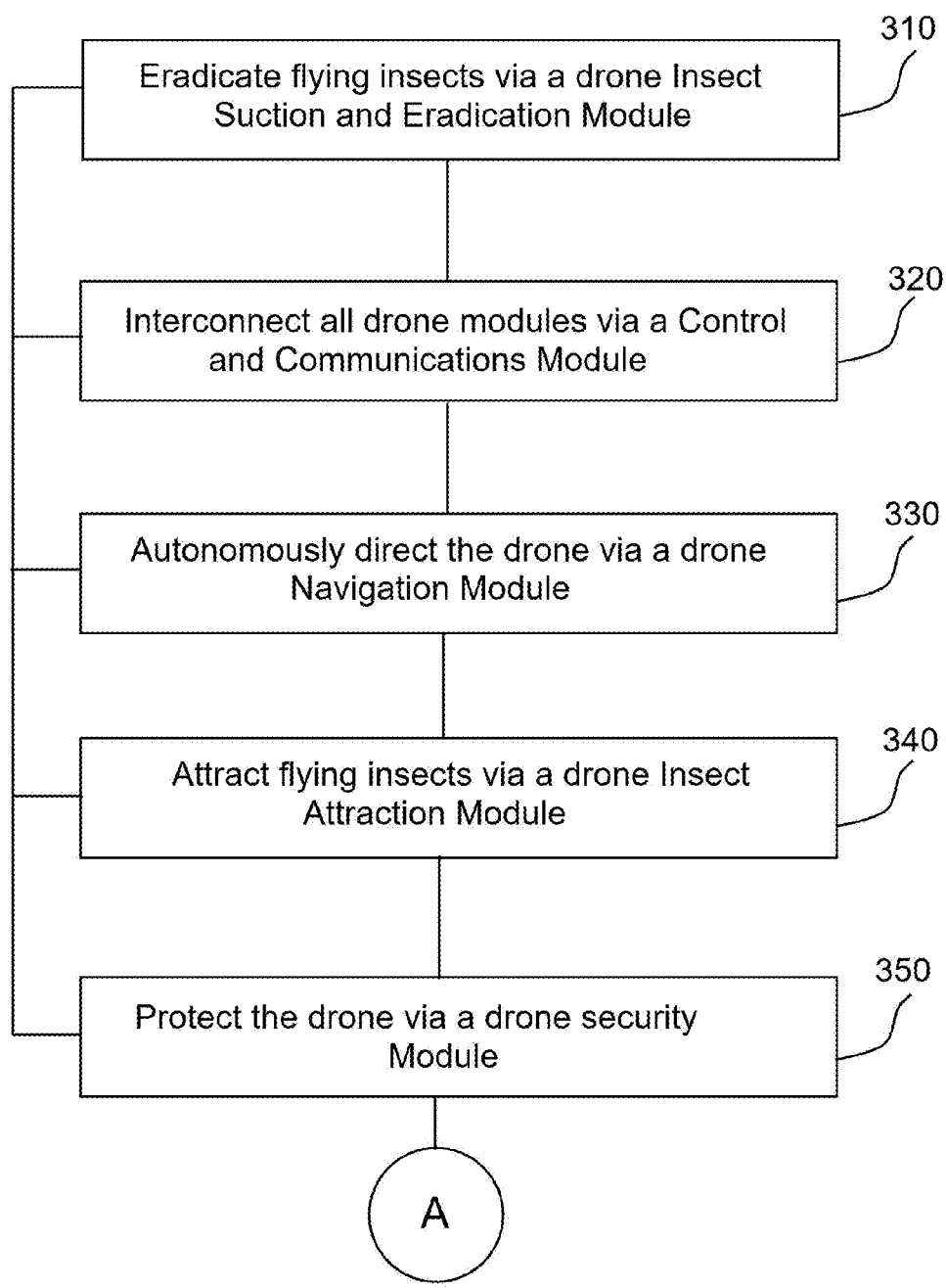
FIG. 30 is a block diagram of a method for eradicating flying insects via the disclosed UAV Drone in accordance with an embodiment of the present disclosure.

FIG. 30 is a block diagram of a method for eradicating flying insects via the disclosed UAV Drone in accordance with an embodiment of the present disclosure. The method includes eradicating 310 flying insects via a drone insect suction and eradication module. The method also includes interconnecting 320 all drone modules via a control and communications module. The method additionally includes autonomously directing 330 the drone via a drone navigation module. The method further includes attracting 340 flying insects via a drone insect attraction module. The method yet includes protecting 350 the drone via a drone security module.

Figure 31:
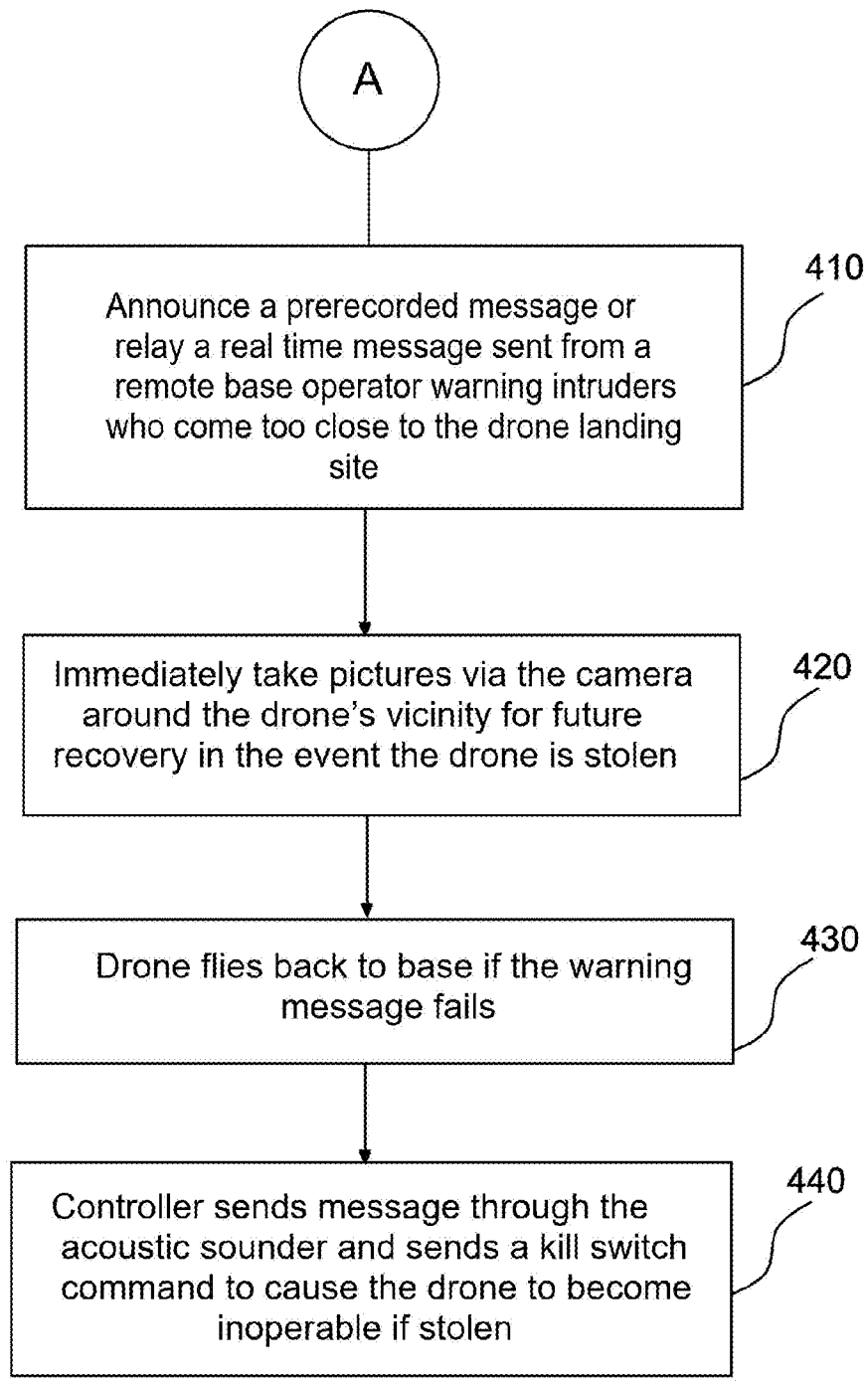
FIG. 31 is a block diagram of a method of security for the disclosed UAV Drone in accordance with an embodiment of the present disclosure.

FIG. 31 is a block diagram of a method of security for the disclosed UAV Drone in accordance with an embodiment of the present disclosure. The method embodiment includes announcing 410 a prerecorded warning message or relay a real-time message sent from a remote base operator warning intruders who come too close to the drone landing site. The method embodiment also includes immediately 420 taking pictures via the camera around the drone's vicinity for future recovery in the event the drone is stolen. The method embodiment additionally includes the drone flying 430 back to base if the warning message fails. The method embodiment further includes the controller sending 440 a message through the acoustic sounder and sending a kill switch command to cause the drone to become inoperable if stolen.

The drone can be stationed indoor and outdoor and may also fly alone or work as a group to fly in a formation to eradicate mosquitoes from a wide area. The drone may fly autonomously or with the aid of an operator controller.

The drone autonomously clears the insects inside the house prior to its owner return home. The live streaming camera can send a viewing of the house and clearing process to the owner. The drone uses its propellers to blast the interior walls and floor with air, forcing all insects to became airborne so the drone can eradicate them. Outdoors, the drone will disturb insect nests with the propeller's downdraft, forcing insects to evacuate. The drone also eradicates outdoor insects while they are airborne.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Notwithstanding specific embodiments of the invention have been described and illustrated, the invention is not to be limited to the specific forms or arrangements of parts so described and illustrated. The scope of the invention is to be defined by the claims and their equivalents included herein or by reference to a related application.

What is claimed is:

1. An unmanned aerial vehicle drone (UAVD), comprising:
    an acoustic wave generator module including a tone frequency synthesizer configured to create disruptive resonant and harmonic vibrations within a target at a variable distance from the module;
    a navigation module comprising a set of 360 degree proximity and obstacle avoidance sensors and a positioning unit (GPS) configured to autonomously direct the drone proximal to but avoidant with a plurality of target locations while in flight;
    an electronics module comprising an electronic central processing unit (CPU), a wireless communication unit, an electronic camera and audio A/V unit and a bus configured to interconnect all drone modules; and
    a removable and configurable modular cartridge and an electromechanical docking port for the cartridge with the drone, the cartridge therefore in electromechanical communication with the drone.

2. The unmanned UAVD of claim 1, wherein the navigation module includes a throttle configured to decrease a velocity of the drone and stop the drone within a proximal distance but avoidant from its target.

3. The unmanned UAVD of claim 1, further comprising a plurality of air blower modules configured to blow away lighter objects and to counteract the drone from spinning when a blower is powered up.

4. The unmanned UAVD of claim 1, further comprising a simultaneous localization and mapping (SLAM) module.

5. The unmanned UAVD of claim 1, wherein the set of 360 degree proximity and obstacle avoidance sensors (OAS) comprise infrared and ultrasound sonar and three dimensional laser scanners with aid from the camera to alert the drone of a proximity to a target and autonomously avoid collisions with obstacles.

6. The unmanned UAVD of claim 1, wherein the removable cartridge houses a variety of specific functional modules for specific applications, the modules can be repurposed or unassembled from the cartridge.

7. The unmanned UAVD of claim 1, wherein the removeable cartridge comprises a spaced apart particle collector module comprising positive and negative charged plates to collect pollutant in the air onto the plates, wherein the plates are coated with Titanium Oxide (Tio2).

8. The unmanned UAVD of claim 1, wherein the removable cartridge comprises a spaced apart electric field anode and cathode plates suspendable beneath the drone with electric cables wound onto a spool configured to be raised or lowered into water to stunt fishes within a generated electric field.

9. The unmanned UAVD of claim 1, wherein the removable cartridge comprises an Ultra violet-C light spectrum module that irradiates germs and bacteria presented on passing air across a drone's propellers and surfaces of Titanium Oxide (Tio2) coated particle collector plates.

10. The unmanned UAVD of claim 1, wherein the removeable cartridge comprises a generator for releasing negative ions from its emitters, the ions configured for attaching to positively charged particles in large numbers to cause germs, mold, pollen and other airborne allergens to become too heavy and precipitate out of the air.

11. The unmanned UAVD of claim 1, wherein the removeable cartridge comprises an Ozone generator module configured to oxidize and attack unwanted odors in confined spaces based on a generated O3 dispersed in the space to be treated.

12. The unmanned UAVD of claim 1, further comprising a plurality of articulated swivel joints configured to allow side and bottom mounted acoustic wave generators to blast vibration energy from the drone in any direction, downward and sideways.

13. The unmanned UAVD of claim 1, further comprising a winch configured to drive a spool wound with electrical cables, one end of cables terminated at a stabilizer bar holding a bottom mounted generator, the cables configured to raise and to lower the bottom generator into polluted water to breakup algae growth.

14. The unmanned UAVD of claim 1, further comprising a microphone configured to pickup echoed signals from the drone to determine setting an output power level for a fluid immersed bottom generator.

15. The unmanned UAVD of claim 1, further comprising a synthesizer frequency that closely matches the natural resonant frequency of a targeted pest's body to induce strong vibrations dislodging the pest and causing death to the targeted pest.

16. The unmanned UAVD of claim 1, further comprising a roof top snow dislodging module configured to hover proximal to a roof top and blast a snow pack with a powerful acoustic wave energy up to causing roof structure vibrate.

17. The unmanned UAVD of claim 1, further comprising a plant pollination modular cartridge configured to hover proximal to plants and blast the plants with synthesized vibrations to release pollens to other plants and thereby induce cross pollination.

18. The unmanned UAVD of claim 1, further comprising a plurality of blowers configured to dislodge material, collect the material and to blow the material from surfaces, wherein the material includes leaves and snow.

19. An unmanned aerial vehicle drone (UAVD) system, comprising:
    an acoustic wave generator module including a tone frequency synthesizer configured to create disruptive resonant and harmonic vibrations within a target at a variable distance from the module;
    a navigation module comprising a set of 360 degree proximity and obstacle avoidance sensors and a positioning unit (GPS) configured to autonomously direct the drone proximal to but avoidant with a plurality of target locations while in flight;
    an electronics module comprising an electronic central processing unit (CPU), a wireless communication unit, an electronic camera and audio A/V unit and a bus configured to interconnect all drone modules; and
    a removable and configurable modular cartridge and an electromechanical docking port for the cartridge with the drone, the cartridge therefore in electromechanical communication with the drone.

20. A method for eradicating flying insects, the method comprising:
    creating a disruptive resonant and harmonic vibration within a target at a variable distance via an acoustic wave generator module including a tone frequency synthesizer;
    navigating via a module comprising a set of 360 degree proximity and obstacle avoidance sensors and a positioning unit (GPS) configured to autonomously direct the drone proximal to but avoidant with a plurality of target locations while in flight;

providing an electronics module comprising an electronic central processing unit (CPU), a wireless communication unit, an electronic camera and audio A/V unit and a bus configured to interconnect all drone modules; and providing a removable and configurable modular cartridge and an electromechanical docking port for the cartridge with the drone, the cartridge therefore in electromechanical communication with the drone.

* * * * *